United States Patent
Bouzid et al.

(10) Patent No.: US 12,434,602 B2
(45) Date of Patent: Oct. 7, 2025

(54) SEAT FOR A VEHICLE AND VEHICLE COMPRISING SUCH A SEAT

(71) Applicant: FAURECIA Sièges d'Automobile, Nanterre (FR)

(72) Inventors: Farouk Bouzid, Bretigny sur Orge (FR); Sylvain Roche, Varennes Changy (FR); David Epaud, Lardy (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 190 days.

(21) Appl. No.: 18/321,303

(22) Filed: May 22, 2023

(65) Prior Publication Data
US 2023/0373360 A1 Nov. 23, 2023

(30) Foreign Application Priority Data
May 23, 2022 (FR) ........................................ 2204922

(51) Int. Cl.
*B60N 2/18* (2006.01)
*B60N 2/02* (2006.01)
*B60N 2/07* (2006.01)

(52) U.S. Cl.
CPC ....... *B60N 2/1835* (2013.01); *B60N 2/02246* (2023.08); *B60N 2/0727* (2013.01)

(58) Field of Classification Search
CPC .............. B60N 2/1835; B60N 2/02246; B60N 2/0727; B60N 2/12; B60N 2/14
See application file for complete search history.

(56) References Cited

U.S. PATENT DOCUMENTS

| | | | | |
|---|---|---|---|---|
| 6,152,533 A * | 11/2000 | Smuk | ....................... | B60N 2/36 297/378.12 |
| 8,388,065 B2 * | 3/2013 | Harden | ................ | B60N 2/3013 297/316 |
| 8,424,969 B2 * | 4/2013 | Kammerer | ........... | B60N 2/3065 297/378.12 |
| 8,474,910 B2 * | 7/2013 | Kammerer | ............. | B60N 2/309 296/65.09 |
| 9,469,349 B1 * | 10/2016 | Mather | .................. | B62D 25/20 |

(Continued)

FOREIGN PATENT DOCUMENTS

| | | |
|---|---|---|
| DE | 102013006485 A1 | 11/2013 |
| EP | 3509902 B1 | 7/2019 |

(Continued)

*Primary Examiner* — Gene O Crawford
(74) *Attorney, Agent, or Firm* — Barnes & Thornburg LLP

(57) ABSTRACT

A vehicle seat having a seat bottom comprising a ramp and a stop, a slide comprising a first slide segment and a second slide segment, a movable element capable of being moved relative to the slide, the seat bottom being pivotally mounted relative to the movable element about a pivot axis, an articulation member that is stationary relative to the slide member, and a pivoting connecting rod having a first end that is articulated to the articulation member and a second end able to slide against the ramp during the movement of the movable element on the first slide segment, the pivoting connecting rod being shaped to push against the ramp and cause the rotation of the seat bottom during the movement of the movable element on the second slide segment, the second end of the connecting rod bearing against the stop.

20 Claims, 6 Drawing Sheets

(56) References Cited

U.S. PATENT DOCUMENTS

| | | | |
|---|---|---|---|
| 10,829,014 B2 | 11/2020 | Sivaraj | |
| 10,926,673 B2 | 2/2021 | Kaemmerer | |
| 2002/0125753 A1* | 9/2002 | Kammerer | ............. B60N 2/309 |
| | | | 297/331 |
| 2007/0096496 A1* | 5/2007 | Saberan | ................. B60N 2/309 |
| | | | 296/65.09 |
| 2018/0281634 A1* | 10/2018 | Furukawa | ............ B60N 2/3011 |

FOREIGN PATENT DOCUMENTS

| | | | |
|---|---|---|---|
| FR | 2459740 A1 | 1/1981 |
| FR | 2917679 A1 | 12/2008 |
| FR | 2990167 B1 | 8/2014 |
| WO | 2018046433 A1 | 3/2018 |

* cited by examiner

SEAT FOR A VEHICLE AND VEHICLE COMPRISING SUCH A SEAT

PRIORITY CLAIM

This application claims priority to French Patent Application No. FR2204922, filed May 23, 2022, which is expressly incorporated by reference herein.

BACKGROUND

The present disclosure relates to a vehicle seat and a method for implementing such a vehicle seat.

SUMMARY

According to the present disclosure, a vehicle seat comprises a seat back, a seat bottom connected to the seat back, the seat bottom comprising at least one ramp extending in a longitudinal direction and a stop extending in a transverse direction, at least one slide extending in the longitudinal direction, the at least one slide comprising a first slide segment and a second slide segment, at least one movable element capable of being moved in the longitudinal direction relative to the at least one slide, the seat bottom being pivotally mounted relative to the movable element about a pivot axis directed in the transverse direction, at least one articulation member that is stationary relative to the at least one slide, and a pivoting connecting rod having at least one first end and one second end, the first end being articulated to the at least one articulation member about an articulation axis directed in the transverse direction, the second end being able to slide against the ramp of the seat bottom during the movement of the at least one movable element on the first slide segment.

In illustrative embodiments, the pivoting connecting rod being shaped to push against the ramp and to cause the seat bottom to rotate about the pivot axis, during the movement of the at least one movable element on the second slide segment, the second end of the connecting rod bearing against the stop.

The features disclosed in the following paragraphs may optionally be implemented. They can be implemented independently of one another or in combination with one another:

The movement of the at least one movable element, when the at least one movable element is positioned on the first slide segment, pivots the seat bottom about the pivot axis and simultaneously moves the at least one movable element when the at least one movable element is positioned on the second slide segment.

Preferably, the seat comprises a single actuator able to move only the at least one movable element, when the at least one movable element is positioned on the first slide segment, and to pivot the seat bottom about the pivot axis and simultaneously move the at least one movable element when the at least one movable element is positioned on the second slide segment.

Advantageously, a single actuator allows the seat both to be moved and pivoted.

Preferably, the pivoting connecting rod comprises at least one pivot leg and a first fastening leg that is bent relative to the pivot leg, the at least one articulation member is shaped to have a first profile delimiting a first housing extending in the transverse direction, the first fastening leg being arranged in the first housing.

Preferably, the pivoting connecting rod is made of a flexible material, and wherein the at least one articulation member is able to force the pivoting connecting rod into a position wherein its second end pushes on the ramp and contributes to pivoting the seat bottom about the pivot axis during the movement of the at least one movable element on the first slide segment and on the second slide segment.

Advantageously, the flexibility of the pivoting connecting rod and its stressing allow the use of a lower power actuator.

Preferably, the pivoting connecting rod comprises a second fastening leg that is bent relative to the first fastening leg, the at least one pivot leg and the first fastening leg being arranged in a plane, the second fastening leg forming an angle greater than 20° with the plane, and preferably greater than 40°, and wherein the articulation member is shaped to have a second profile delimiting a second housing extending in the longitudinal direction, the second fastening leg being arranged in the second housing.

Preferably, the seat comprises an anchoring device that is able to lock the pivoting of the seat bottom relative to the at least one movable element, during the movement of the at least one movable element on the first slide segment, the anchoring device being unlocked, during the movement of the at least one movable element on the second slide segment.

Preferably, the seat comprises two parallel slides that are distant in the transverse direction, and wherein the pivoting connecting rod has a general U shape having a central support leg, two pivot legs, two first fastening legs and two second fastening legs.

Preferably, the flexible material is made of spring steel.

Preferably, the actuator is an electric motor, the actuator being able to move the at least one movable element of the second slide segment toward the first slide segment, the actuator and the pivoting connecting rod driving the rotation of the seat bottom about the pivot axis in a clockwise direction and the movement of the seat bottom in the longitudinal direction when the movable element is moved on the first slide segment.

Preferably, the seat further comprises a control member that is configured to unlock the anchoring device and a controller that is able to transmit an unlocking command to the control member when the seat bottom is moved from the first slide segment toward the second slide segment.

Preferably, the anchoring device is able to be manually unlocked regardless of the position of the movable element on the first slide segment and on the second slide segment.

Preferably, the at least one movable element moves only on the first slide segment for the adjustment of the longitudinal position of the seat bottom, the anchoring device being held locked.

Preferably, the seat comprises a plate attached to the at least one slide, the at least one articulation member being attached to the plate.

Preferably, the at least one articulation member is intended to be attached to a floor of a motor vehicle.

Preferably, the ramp and the stop are formed by a support comprising a hole wherein the second end of the pivoting connecting rod is able to move.

Preferably, the first slide segment has a length of between 50 and 180 millimeters, and preferably equal to 150 millimeters, and wherein the second slide segment has a length of between 30 and 70 millimeters, preferably equal to 50 millimeters.

The present disclosure also relates to a motor vehicle comprising a seat as mentioned above.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the various figures, the same references designate identical or similar elements.

In the following description, the spatial positioning indications such as top, bottom, upper, lower, horizontal, vertical, etc. are given for the clarity of the description, as a function of the usual use position of the seat, but are not limiting. More particularly, the orientations relative to the front and the rear of the seat relate to the usual use position of the seat.

In the longitudinal direction X, a horizontal direction is understood to extend between the front and the rear of the vehicle seat. The transverse direction Y refers to a horizontal direction, extending from one side of the vehicle seat to the other side of the vehicle seat. The vertical direction Z means the direction perpendicular to the longitudinal X and transverse Y directions.

Figure 1:
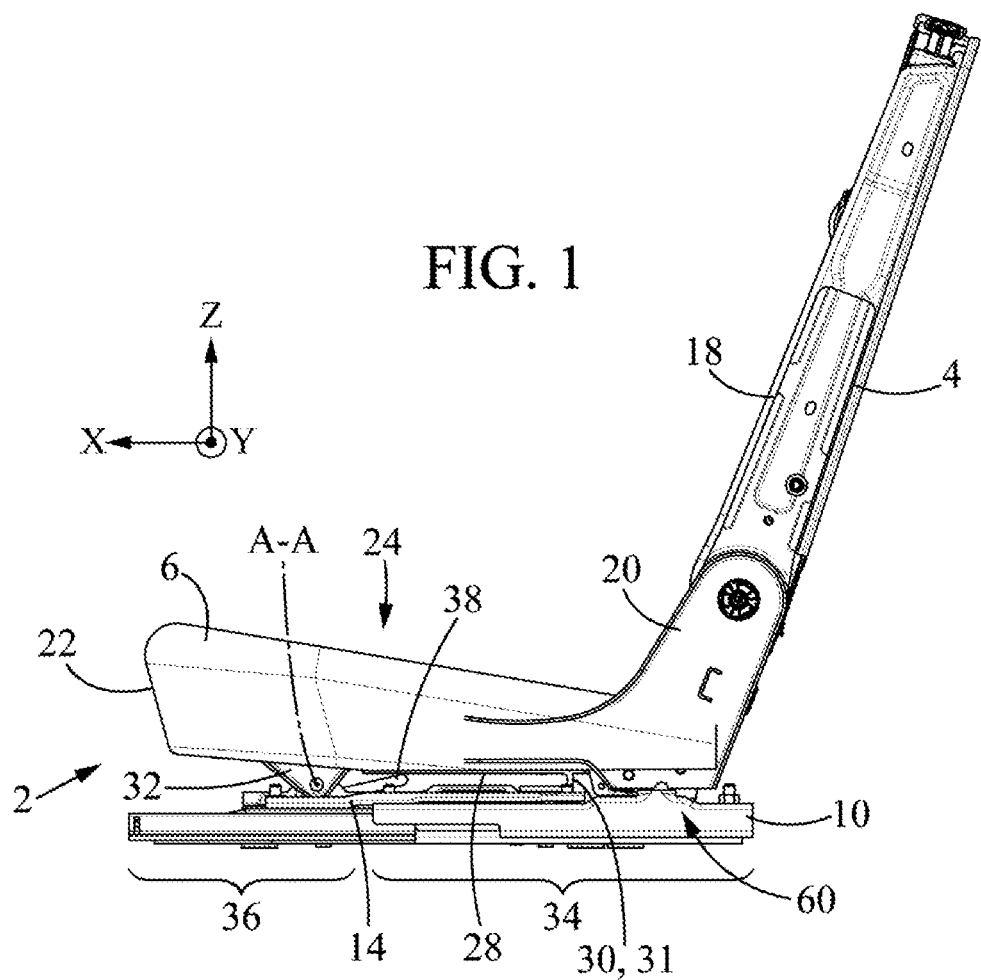
FIG. 1 is a side view of the seat according to an example embodiment of the present disclosure.
Figure 2:
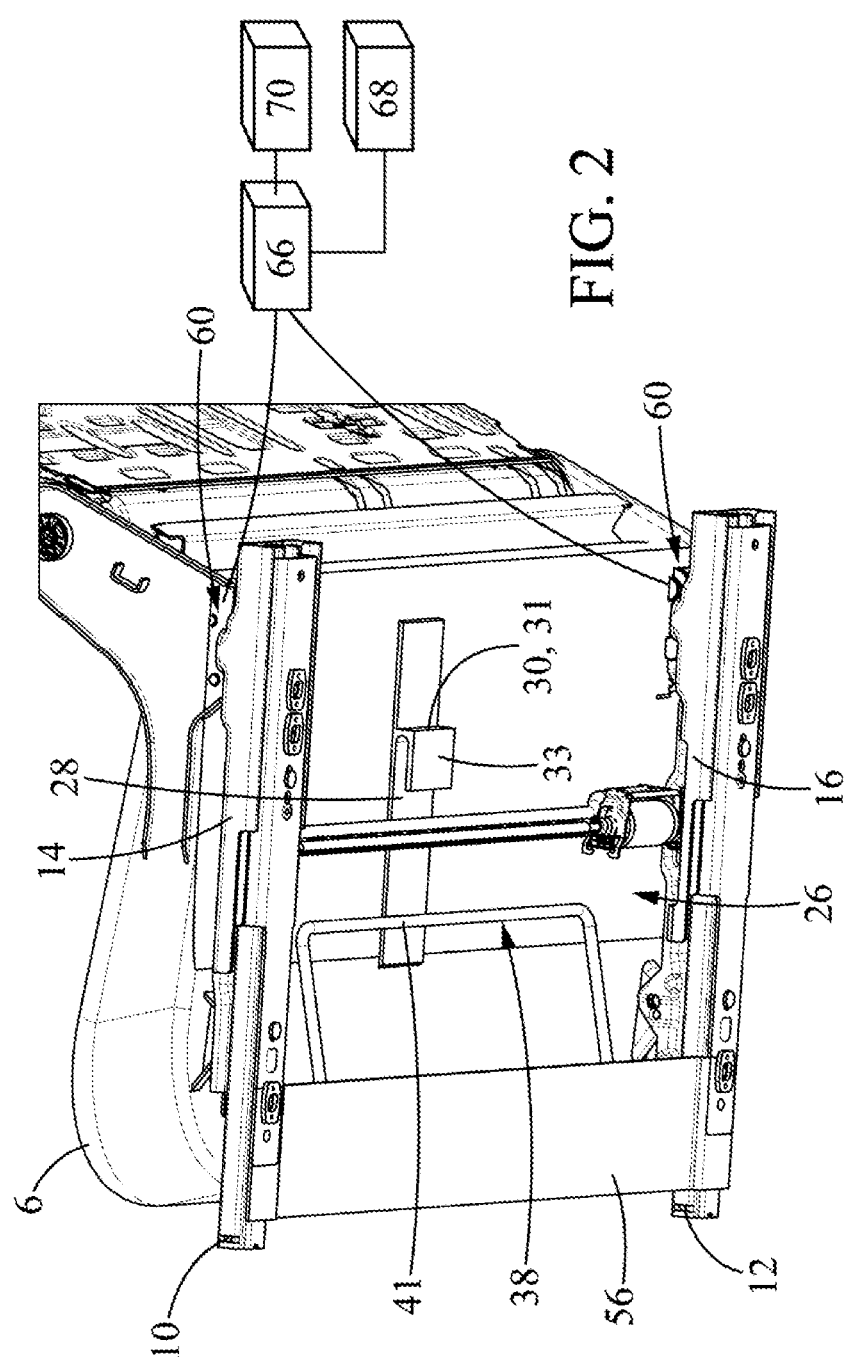
FIG. 2 is a bottom view of the seat shown in FIG. 1.

As shown in FIGS. 1 and 2, a vehicle seat 2 comprises a seat back 4, a seat bottom 6, two slides 10, 12 and two movable elements 14, 16 that are movable along the slides.

The seat 2 may, for example, be a front seat of a motor vehicle with three doors. A door can be arranged longitudinally at the seat. Another seat may be arranged longitudinally behind the seat. The motor vehicle may be devoid of a door arranged longitudinally at the other seat. According to another variant, the seat may be a seat of a second row of seats, in particular in a vehicle with five doors comprising three rows of seats.

The seat back 4 here comprises a seat back armature 18 and a base 20. The seat back armature here is pivotally mounted relative to the base using an articulation mechanism (not shown). The articulation mechanism is arranged on each side of the seat, between the seat back and the base. In the illustrated example, the base 20 takes the form of two lateral uprights, connected together by a cross-member and attached to the seat bottom.

The seat bottom 6 comprises a seat bottom frame 22 provided with springs and a lining. It comprises an upper face 24 intended to receive an occupant and a lower face 26 opposite the upper face. The lower face is situated facing the floor of the vehicle when the seat is mounted in the vehicle.

As a variant, the seat bottom and the seat back are formed by a semi-rigid shell.

The seat bottom further comprises a ramp 28 on its lower face and a stop 30 arranged at the end of the ramp. In the embodiment shown, the ramp 28 is formed by a flat support extending in the longitudinal direction X.

The stop 30 comprises a tab 31 contained in a plane (Y, Z) and which extends at least in a transverse direction Y. In the embodiment shown, the tab 31 is extended by a tab extension 33 that is curved relative to the tab 31. The tab 31 is substantially perpendicular to the lower face of the seat bottom. The tab extension 33 is substantially parallel to the lower face of the seat bottom. The ramp 28 and the tab extension 33 form a longitudinal guide that is able to receive one end of a pivoting connecting rod, as explained below.

Alternatively, the stop 30 only comprises the tab 31.

As a variant, the assembly of the ramp 28 and the stop 30 is formed by a support comprising an opening extending in the longitudinal direction X. In this case, the second end of the connecting rod is able to slide in the opening.

Alternatively, the seat bottom comprises two ramps 28 arranged substantially above a part of the slides 10, 12, along the lateral sides of the frame of the seat bottom 22.

The seat bottom 6 is carried by the movable elements 14, 16. The seat bottom is able to move in the longitudinal direction X during the movement of the two movable elements 14, 16 along the slides. The seat bottom is also pivotally mounted relative to the movable elements 14, 16. For this purpose, the seat bottom comprises two attachment plates 32 that are articulated to the movable elements 14, 16 about a pivot axis A-A directed in the transverse direction Y. The two attachment plates are arranged on the front lateral parts of the frame of the seat bottom.

The slides 10, 12 are intended to be attached to the floor of the passenger compartment of a motor vehicle. The slides are separated from one another, in the transverse direction Y. The two slides here are parallel. For the purposes of the description of the present disclosure, a first slide segment 34 located on the rear side of the seat and second slide segment 36 located on the front side of the seat are defined. The first slide segment has a length of between 50 and 180 millimeters. Preferably, the first slide segment has a length equal to 150 millimeters. The second slide segment has a length of between 30 and 70 millimeters. Preferably, the second slide segment has a length equal to 50 millimeters.

Figure 3:
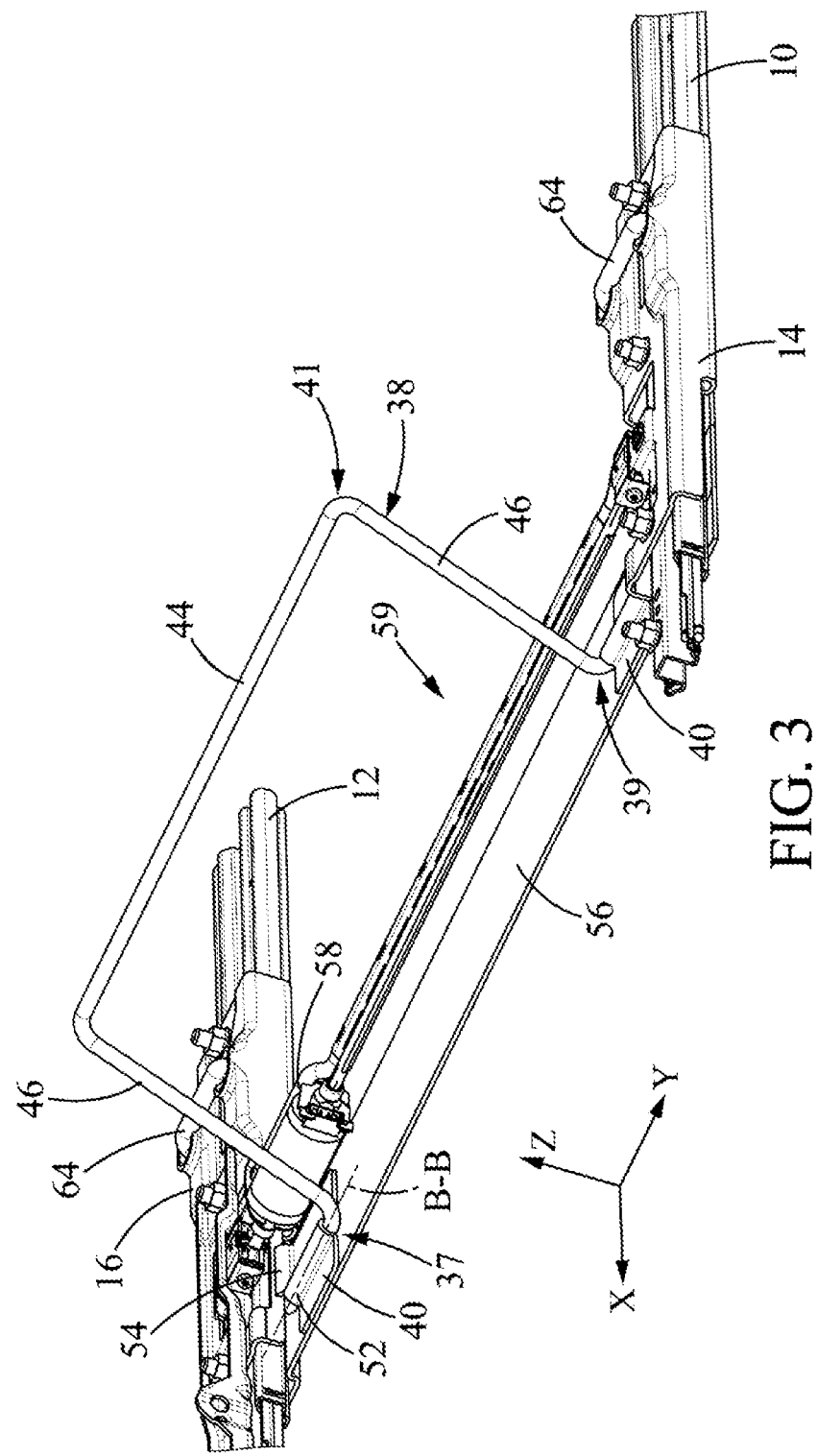
FIG. 3 is a perspective view of a portion of the seat shown in FIG. 1.
Figure 4:
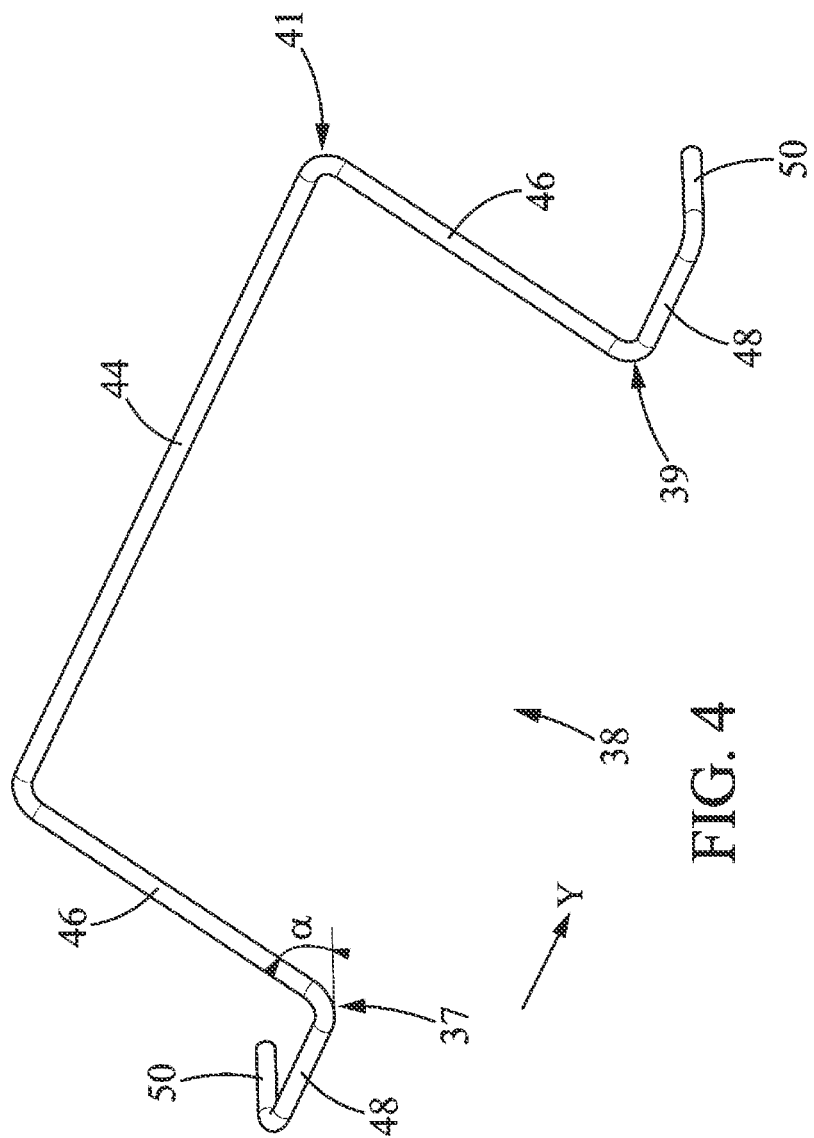
FIG. 4 is a perspective view of a pivoting connecting rod of the seat shown in FIG. 1.

With reference to FIGS. 2 to 4, the seat 2 further comprises a pivoting connecting rod 38 that is capable of causing the rotation of the seat about the pivoting axis A-A and two articulation members 40 of the pivoting connecting rod.

In the embodiment shown, the pivoting connecting rod 38 has two first ends 37, 39 and one second end 41. Each first end 39 is articulated to an articulation member 40 about an articulation axis B-B directed in the transverse direction Y. The second end 41 bears either against the ramp 28 of the seat bottom or against the stop 30.

Referring to FIG. 4, in the embodiment shown, the pivoting connecting rod 38 has a general U shape having a central support leg 44 forming the second end 41, two pivot legs 46 that are bent relative to the central support leg, and a first and a second fastening leg 48, 50 arranged at the end of each pivot leg. An assembly of first and second fastening legs 48, 50 forms the first end referenced 37 of the pivoting connecting rod. Another assembly of first and second fastening legs 48, 50 forms the other first end referenced 39 of the pivoting connecting rod. The first fastening leg 48 extends in the transverse direction Y. The second fastening leg 50 extends substantially perpendicularly to the first fastening part. The central support leg 44 is arranged in the transverse direction Y.

With reference to FIG. 3, the articulation member 40 is for example formed by a metal plate shaped to have a first profile 52 extending in the transverse direction Y and a second profile 54 extending in the longitudinal direction X. The first profile delimits a first housing. The second profile delimits a second housing.

On either side of the pivoting connecting rod 38 and for each articulation member 40, the first fastening leg 48 is arranged in the first housing. The second fastening leg 50 is arranged in the second housing. The pivoting connecting rod 38 is able to pivot about a transverse axis Y passing through the first fastening leg 48.

In the embodiment shown, the pivoting connecting rod 38 is made of a flexible material. For example, the pivoting connecting rod 38 is made of spring steel.

The pivoting connecting rod is shaped so that, at rest, that is to say, without stress, the central support leg 44, the pivot legs 46 and the first fastening legs 48 are arranged in the same plane. The second fastening legs 50 extend with an angle α relative to this plane. The angle α is greater than 20°. Preferably, the angle α is greater than 40°. Thus, when the pivoting connecting rod 38 is mounted in the articulation members 40 and it is not stressed, it extends in a plane forming an angle α with respect to a horizontal plane.

Alternatively, the pivoting connecting rod comprises only first fastening legs extending in the transverse direction Y and no second fastening legs. In this case, the articulation member 40 comprises only a profile extending in the transverse direction Y. The pivoting connecting rod may here be made of a suitable steel.

Alternatively, the pivoting connecting rod 38 is replaced by two pivoting connecting rods each having a pivot leg 46, a first fastening leg 48 and optionally a second fastening leg 50. In this case, the pivoting connecting rod 38 does not comprise a central support leg. The second ends of the connecting rods then bear against the ramp 28 or the stop 30.

Preferably, the seat comprises a plate 56 attached to the slides 10, 12. The articulation members 40 are attached to this plate 56. Alternatively, the articulation members 40 are attached directly to the floor of the vehicle body.

The articulation members 40 are stationary relative to the slides. They are for example attached to the slides directly or via an additional part. Alternatively, the articulation members 40 are attached directly to the floor of the vehicle.

The seat further comprises an actuator 58 and a drive mechanism 59 able to move the movable elements 14, 16 on the slides. The actuator 58 and the drive mechanism 59 are carried by the movable elements 14, 16. Any suitable drive mechanism 59 of the movable elements on the slides may be used.

Preferably, the actuator 58 is an electric motor. This electric motor drives the movement of the movable elements 14, 16 on the slides 10, 12 and allows the seat to pivot about the pivot axis A-A while simultaneously allowing the movable elements to move on the second slide segment 36, as described below.

Advantageously, a single motor allows both the performance of the function of adjusting the longitudinal position of the seat and the implementation of the so-called easy entry position.

Preferably, the seat comprises two anchoring devices 60 that are able to lock the pivoting of the seat about the pivot axis A-A relative to the movable elements 14, 16.

An anchoring device 60 is provided between each of the lateral uprights of the leg 20 and a movable element. Each anchoring device comprises a bolt 62 and a striker 64. The bolt 62 is mounted so as to rotate about a transverse axis on the lateral upright of the base 20. The striker 64 is attached to the movable element 14, 16. The bolt 62 is normally at least partially received in the striker 64 to secure the base 20 of the seat bottom and the movable element 14, 16.

Figure 5:
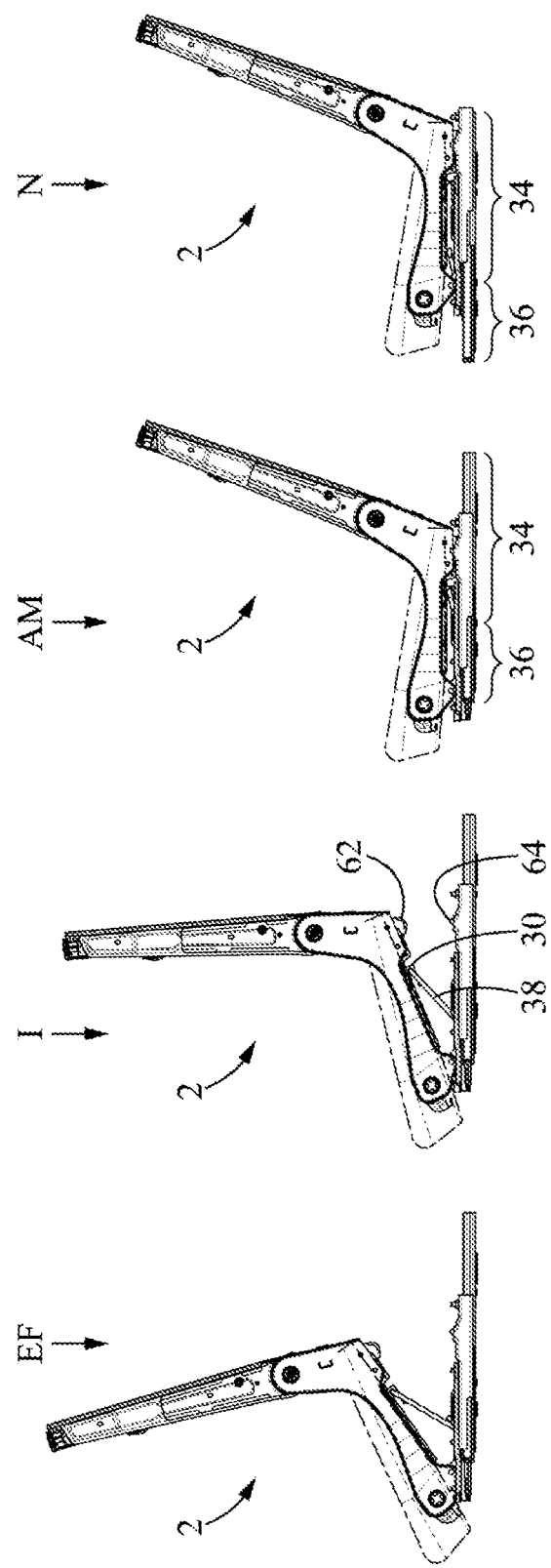
FIG. 5 is a side view showing four successive positions of the seat when the seat passes from a nominal position to a so-called easy entry position.

With reference to FIGS. 2 and 5, the seat 2 further comprises a control member 66 allowing the two anchoring devices to be unlocked in a synchronized manner. For example, the control member 66 comprises a mechanical actuator. The control member is shaped to control a rotation of the bolt 62 about the transverse axis, completely releasing the bolt from the striker. The bolt is, for example, elastically stressed to an unlocked position of the anchoring device, the control member 66 blocking, in its locked position, the pivoting of the bolt. On the contrary, in an unlocked position, the control member 66 allows the bolt to pivot toward its unlocked position.

The anchoring device 60 is also able to be manually unlocked. This unlocking can be implemented regardless of the position of the movable element 14, 16 on the first slide segment 34 or on the second slide segment 36. To this end, the seat 2 comprises an unlocking member connected to the control member 66. The unlocking member is for example made up of a strap 68. The strap 68 is able to control the control member 66 so that the latter unlocks the anchoring devices 60. The strap 68 is for example directed toward the seats arranged behind the seat 2. It can thus be actuated by the passengers of the rear seats to release the pivoting of the seat bottom. The actuation can be implemented by pulling on the strap.

Finally, the seat 2 further comprises a controller 70 able to transmit an unlocking command to the control member 66 when the seat bottom is moved from the first slide segment 34 toward the second slide segment 36. The controller 70 is for example actuated by a control button located near the door located facing the seat 2, as described below. The controller may be a programmable apparatus that uses software, an integrated circuit (ASIC), or a part of the engine control unit (ECU).

FIG. 5 illustrates a first example of a method for implementing the seat 2 allowing the passage of the seat from a nominal position N, illustrated on the right, to a position called "easy entry" position EF, illustrated on the left.

In the embodiment shown, in the nominal position N, the seat bottom 6 is positioned at a maximum rear position. The movable elements 14, 16 are positioned as far to the rear as possible of the first slide segment 34. It should be noted that the nominal starting position may vary. In fact, the longitudinal position of the seat 2 may be different. Thus, the longitudinal position of the movable elements 14, 16 may in principle vary over the entire range of the first slide segment 34. In this position, the pivoting connecting rod 28 is elastically stressed under the seat against the ramp 28.

With reference to FIG. 5, when a request to go to the "easy entry" position EF is made by a passenger or a future passenger, for example by pressing the control button. The request is transmitted to the controller 70. The controller transmits a command to the actuator 58. The actuator 58 causes the movable elements 14, 16 to move on the first slide segment 34. During this movement, the second end 41 of the pivoting connecting rod 38 slides on the ramp 28. The pivoting connecting rod 38 is still elastically stressed against the ramp 28.

When the movable elements 14, 16 reach the beginning of the second slide segment 36, the second end 41 of the pivoting connecting rod bears against the stop 30. The seat is in a maximum front position AM, shown in FIG. 5.

The controller 70 transmits an unlocking command to the control member 66 for the anchoring devices 60. The control member 66 retransmits this command to the anchoring devices 60. The anchoring devices control the rotation of the bolts 62 and unlock the anchoring of the rear part of the seat frame from the movable elements 14, 16. The actuator 58 continues to drive the movement of the movable elements 14, 16. Since the second end 41 of the pivoting connecting rod is in abutment against the stop 30, the seat bottom 6 pivots about the pivot axis A-A, pushed by the second end of the connecting rod and stressed by the pivoting connecting rod 38, which seeks to regain its unstressed position. The pivoting connecting rod is tensioned under the seat to relieve the actuator 58 during pivoting of the seat bottom. The pivoting connecting rod 38 pushes against the ramp 28 and causes the seat bottom to rotate about the pivot axis A-A and in a counterclockwise direction, during the movement of the at movable element 14, 16 on the second slide segment 36. At the same time, the movable elements 14, 16 continue to move the seat bottom 6 on the second slide segment 36 as illustrated in the intermediate position I shown in FIG. 5.

When the movable elements 14, 16 are positioned at the end of the second slide segment 36, the seat 2 is in the so-called easy entry position.

To return to its nominal position, the actuator 58 is driven in the opposite direction. It drives the movement of the movable elements 14, 16 from the second slide segments 36 toward the first slide segments 34. During this movement, the pivoting connecting rod 38, still abutting against the stop 30, drives the rotation the seat bottom 6 about the pivot axis A-A in a clockwise direction. When the movable elements 14, 16 arrive on the first slide segments, in particular the anchoring device 60 relocks itself, for example the bolt 62 relocks itself on the striker 64, then the second end 41 of the pivoting connecting rod 38 moves away from the stop 30 and slides on the ramp 28 toward the front of the seat. The seat bottom is then moved only in the longitudinal direction X.

As a variant, when the pivoting connecting rod 38 is not made of an elastic material and it is not elastically stressed under the seat 2, it is only the force of the actuator 58 that tilts the seat bottom 6 about the pivot axis A-A.

Figure 6:
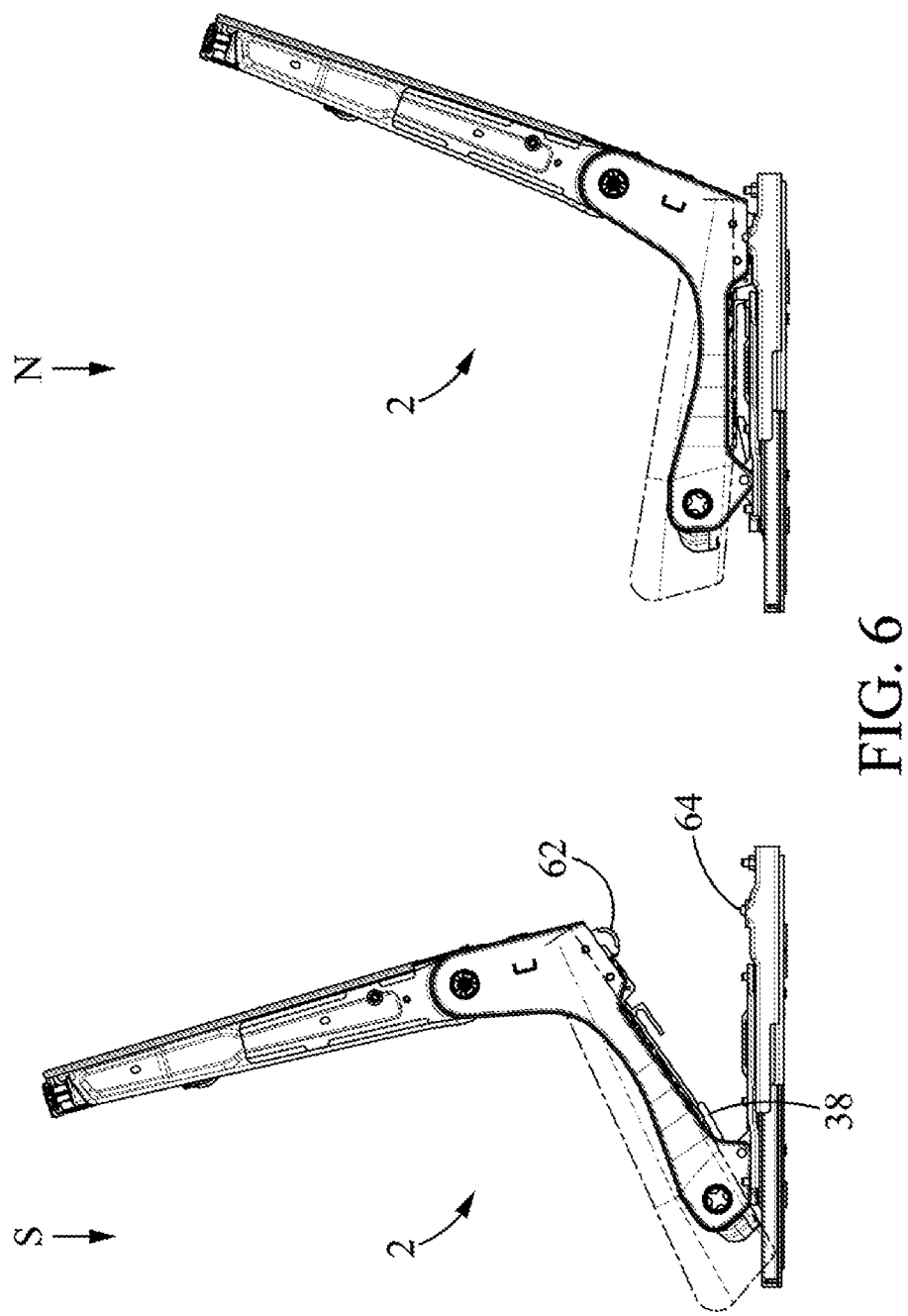
FIG. 6 is a side view showing two successive positions of the seat when the seat passes from a nominal position to a so-called emergency exit position.

With reference to FIG. 6, when a request to go to the "emergency exit" position S is made by a passenger by actuating the unlocking member, for example by pulling on the strap 68. The control member 66 transmits an unlocking command to the anchoring devices 60. The anchoring devices control the rotation of the bolts 62 and unlock the anchoring of the rear part of the seat frame from the movable elements 14, 16. The passenger can then push the seat back manually in order to pivot the seat bottom about the pivot axis A-A. The movable elements are not moved during the passage to the emergency exit position. The emergency exit position S can be implemented regardless of the position of the movable elements 14, 16 on the first slide segments 34.

Referring to FIG. 5, when a passage from a nominal position N to a maximum front position AM is requested by a passenger, the movable elements 14, 16 move only on the first slide segments 34 for the adjustment of the longitudinal position X of the seat bottom. The anchoring device 60 is held locked.

The anchoring device can be unlocked manually.

In the automotive field, in particular, a vehicle seat may be configured to be able to have a position that facilitates access to the spaces located behind the seat (referred to hereinafter as "easy entry position"). Such a seat may be implemented in a vehicle comprising a number of pairs of doors that is smaller than the number of rows of seats in order to allow access to the last row of seats in the vehicle, that is to say, to the row of seats arranged longitudinally furthest to the rear of the vehicle.

In one example, the easy entry position corresponds to a configuration of the seat where a seat back of the seat is tilted toward a seat bottom of the seat and/or the seat is advanced to the front of the slides. The seat comprises a specific motor for performing the passage from a nominal position of the seat to a position at the front of the slides and a specific motor for performing the pivoting of the seat back toward the seat.

A first object of the present disclosure is to propose a seat implementing the easy entry position for a reduced cost.

A second object of the present disclosure is to provide assistance in implementing the easy entry position.

The present disclosure relates to a vehicle seat having a seat bottom comprising a ramp (28) and a stop (30), a slide (10, 12) comprising a first slide segment and a second slide segment, a movable element (14, 16) capable of being moved relative to the slide, the seat bottom being pivotally mounted relative to the movable element about a pivot axis, an articulation member that is stationary relative to the slide member, and a pivoting connecting rod (38) having a first end that is articulated to the articulation member and a second end (41) able to slide against the ramp during the movement of the movable element on the first slide segment, the pivoting connecting rod being shaped to push against the ramp and cause the rotation of the seat bottom during the movement of the movable element on the second slide segment, the second end (41) of the connecting rod bearing against the stop.

The invention claimed is:

1. A seat for a vehicle comprising:
    a seat back,
    a seat bottom connected to the seat back, the seat bottom comprising at least one ramp extending in a longitudinal direction and a stop extending in a transverse direction,
    at least one slide extending in the longitudinal direction, the at least one slide comprising a first slide segment and a second slide segment,
    at least one movable element capable of being moved in the longitudinal direction relative to the at least one slide, the seat bottom being pivotally mounted relative to the movable element about a pivot axis directed in the transverse direction,
    at least one articulation member that is stationary relative to the at least one slide, and
    a pivoting connecting rod having at least one first end and one second end, the first end being articulated to the at least one articulation member about an articulation axis directed in the transverse direction, the second end being able to slide against the ramp of the seat bottom during the movement of the at least one movable element on the first slide segment,
    the pivoting connecting rod being shaped to push against the ramp and to cause the seat bottom to rotate about the pivot axis, during the movement of the at least one movable element on the second slide segment, the second end of the connecting rod bearing against the stop.

2. The seat of claim 1, wherein the movement of the at least one movable element, when the at least one movable element is positioned on the first slide segment, pivots the seat bottom about the pivot axis and simultaneously moves the at least one movable element when the at least one movable element is positioned on the second slide segment.

3. The seat of claim 1, which comprises a plate attached to the at least one slide, the at least one articulation member being attached to the plate.

4. The seat of claim 1, wherein the at least one articulation member is configured to be attached to a floor of a motor vehicle.

5. The seat of claim 1, wherein the ramp and the stop are formed by a support comprising a hole wherein the second end of the pivoting connecting rod is able to move.

6. The seat of claim 1, wherein the first slide segment has a length of between 50 and 180 millimeters, and wherein the second slide segment has a length of between 30 and 70 millimeters.

7. A motor vehicle comprising the seat of claim 1.

8. The seat of claim 1, wherein the first slide segment has a length equal to 150 millimeters, and wherein the second slide segment has a length equal to 50 millimeters.

9. The seat of claim 1, which comprises a single actuator able to move only the at least one movable element, when the at least one movable element is positioned on the first slide segment, and to pivot the seat bottom about the pivot axis and simultaneously move the at least one movable element when the at least one movable element is positioned on the second slide segment.

10. The seat of claim 9, wherein the actuator is an electric motor, the actuator being able to move the at least one movable element of the second slide segment toward the first slide segment, the actuator and the pivoting connecting rod driving the rotation of the seat bottom about the pivot axis in a clockwise direction and the movement of the seat bottom in the longitudinal direction when the movable element is moved on the first slide segment.

11. The seat of claim 1, wherein the pivoting connecting rod is made of a flexible material, and wherein the at least one articulation member is able to force the pivoting connecting rod into a position wherein its second end pushes on the ramp and contributes to pivoting the seat bottom about the pivot axis during the movement of the at least one movable element on the first slide segment and on the second slide segment.

12. The seat of claim 11, wherein the flexible material is made of spring steel.

13. The seat of claim 1, wherein the pivoting connecting rod comprises at least one pivot leg and a first fastening leg that is bent relative to the pivot leg, the at least one articulation member is shaped to have a first profile delimiting a first housing extending in the transverse direction, the first fastening leg being arranged in the first housing.

14. The seat of claim 13, wherein the pivoting connecting rod comprises a second fastening leg that is bent relative to the first fastening leg, the at least one pivot leg and the first fastening leg being arranged in a plane, the second fastening leg forming an angle greater than 20° with the plane, and wherein the articulation member is shaped to have a second profile delimiting a second housing extending in the longitudinal direction, the second fastening leg being arranged in the second housing.

15. The seat of claim 13, which comprises two parallel slides that are distant in the transverse direction, and wherein the pivoting connecting rod has a general U shape having a central support leg, two pivot legs, two first fastening legs and two second fastening legs.

16. The seat of claim 13, wherein the pivoting connecting rod comprises a second fastening leg that is bent relative to the first fastening leg, the at least one pivot leg and the first fastening leg being arranged in a plane, the second fastening leg forming an angle greater than 40° with the plane, and wherein the articulation member is shaped to have a second profile delimiting a second housing extending in the longitudinal direction, the second fastening leg being arranged in the second housing.

17. The seat of claim 1, which comprises an anchoring device that is able to lock the pivoting of the seat bottom relative to the at least one movable element, during the movement of the at least one movable element on the first slide segment, the anchoring device being unlocked, during the movement of the at least one movable element on the second slide segment.

18. The seat of claim 17, which further comprises a control member that is configured to unlock the anchoring device and a controller that is able to transmit an unlocking command to the control member when the seat bottom is moved from the first slide segment toward the second slide segment.

19. The seat of claim 17, wherein the anchoring device is able to be manually unlocked regardless of the position of the movable element on the first slide segment and on the second slide segment.

20. The seat of claim 17, wherein the at least one movable element moves only on the first slide segment for the adjustment of the longitudinal position of the seat bottom, the anchoring device being held locked.

* * * * *